(12) United States Patent
Okada et al.

(10) Patent No.: US 6,894,721 B1
(45) Date of Patent: May 17, 2005

(54) IMAGE SIGNAL PROCESSING DEVICE AND IMAGE SIGNAL PROCESSING METHOD

(75) Inventors: Hiroyuki Okada, Tokyo (JP); Shouji Kawahito, Aichi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/566,122

(22) Filed: May 5, 2000

(30) Foreign Application Priority Data

May 6, 1999 (JP) .......................................... 11-125436

(51) Int. Cl.[7] .............................................. H04N 5/235
(52) U.S. Cl. ................................... 348/229.1; 348/678
(58) Field of Search ............................. 348/678, 229.1, 348/223.1, 220, 255, 272, 273

(56) References Cited

U.S. PATENT DOCUMENTS

| | | | | |
|---|---|---|---|---|
| 4,771,192 A | * | 9/1988 | Jackson ....................... | 348/586 |
| 5,235,412 A | * | 8/1993 | Boisvert et al. ............ | 348/659 |
| 5,329,312 A | * | 7/1994 | Boisvert et al. ............ | 348/256 |
| 5,457,494 A | * | 10/1995 | Suga et al. ............... | 348/229.1 |
| 5,461,429 A | * | 10/1995 | Konishi et al. ........... | 348/223.1 |
| 5,828,406 A | * | 10/1998 | Parulski et al. ......... | 348/333.11 |
| 5,874,994 A | * | 2/1999 | Xie et al. ..................... | 348/349 |
| 6,011,636 A | * | 1/2000 | Tanaka et al. .............. | 358/527 |
| 6,650,363 B1 | * | 11/2003 | Ukita ....................... | 348/223.1 |

FOREIGN PATENT DOCUMENTS

| | | |
|---|---|---|
| JP | 04-271593 | 9/1992 |
| JP | 06-303619 | 10/1994 |
| JP | 07-327172 | 12/1995 |
| JP | 2000-253410 | 9/2000 |

* cited by examiner

Primary Examiner—Tuan Ho
Assistant Examiner—Gevell Selby
(74) Attorney, Agent, or Firm—Whitham, Curtis & Christofferson, P.C.

(57) ABSTRACT

An image signal processing device enables white balance with high precision to be obtained while causing circuit scale to be reduced, causing number of control line to be small, and causing influence of dispersion of elements to be small. The image signal processing device consists of a gain controller for adjusting a signal level into a prescribed signal level in every a plurality of color signals outputted from the color image sensor, an analog/digital converter for converting an image signal obtained from an output of the gain controller into a digital signal successively, and a controller for controlling a gain of the gain controller, wherein the controller inputs therein at least more than one control signal of a synchronizing signal which is switched in every respective pixels while synchronizing with an arrangement of a color filter of a color image sensor, a synchronizing signal which is switched in every respective lines, a synchronizing signal which is switched in every respective frames, a synchronizing signal which is switched in every respective fields, and a gain set value in every respective arrangement of the color filter.

32 Claims, 6 Drawing Sheets

IMAGE SIGNAL PROCESSING DEVICE AND IMAGE SIGNAL PROCESSING METHOD

BACKGROUND OF THE INVENTION

The present invention relates to an image signal processing device. More to particularly, this invention relates to an image signal processing device and an image signal processing method in which gain control function is integrated with white balance function for controlling brightness of a picture.

DESCRIPTION OF THE PRIOR ART

Formerly, for instance, the Japanese Patent Application Laid-Open No. HEI 10-271491 (hereinafter referred to as a first conventional example) and the Japanese Patent Application Laid-Open No. HEI 5-316376 (herein after referred to as a second conventional example) disclose this kind of image signal processing device in which gain control function is integrated with white balance function described above. These image signal processing devices are used in the image pick-up device, for giving necessary processing to an analog signal obtained from the image pick-up element, before converting the analog signal into digital signal, as the object.

FIG. 1 is a block diagram showing a configuration of an image signal processing device of a first conventional example.

The image signal processing device comprises a noise rejection circuit (hereinafter referred to as CDS: Correlated Double Sampling Circuit) 41 for removing noise included in an image pick-up element, a gain control circuit (hereinafter referred to as GCA circuit: Gain Control Amplifier) 42 for adjusting gain in such a way that a picture projected onto a monitor becomes prescribed brightness, a white balance circuit 43 executing balance correction of white, a dispersion correction circuit 44 for correcting dispersion of projected image signal, an A/D converter 45 for converting an analog signal into a digital signal, a CPU 47 for controlling gain, and a D/A converter 46.

There is described operation of the image signal processing device of the first conventional example having the above described configuration.

The projected image signal is obtained from the image pick-up element (not illustrated). The CDS circuit 41 removes noise included in the projected image signal. The projected image signal from which the noise is removed is inputted into the GCA circuit 42. The GCA circuit 42 adjusts level of output signal in accordance with level control signal applied to a gain control terminal, before outputting from its output terminal. This gain is controlled by the CPU 47 and the D/A converter 46 in every one frame such that brightness projected on the monitor becomes optimum. The output terminal of GCA circuit 42 is connected to the white balance circuit 43. The white balance circuit 43 executes color balance correction of the projected image signal to output from the output terminal. The output terminal of the white balance circuit 43 is connected to the dispersion correction circuit 44. Dispersion of the projected image signal is corrected in the dispersion correction circuit 44, before the projected image signal is inputted to the A/D converter 45, thus the projected image signal is converted from the analog signal to the digital signal. The projected image signal undergoing digitalization is outputted to the CPU 47. The CPU 47 sends a control signal to the D/A converter 46 such that the monitor becomes prescribed brightness. The D/A converter 46 converts the control signal sent from the CPU 47 into an analog control signal in order to control the gain of the GCA circuit 42.

FIG. 2 is a block diagram showing a configuration of the image signal processing device of the second example.

The image signal processing device comprises an S/H circuit removing noise included in a projected image signal outputted from an image pick-up element 51, an amplifier 53 whose gain is fixed, attenuators 54, 55, and 56 in which three kinds of attenuation ratios are set, a selector 58 for switching output of the attenuators 54, 55, and 56, and an A/D converter 59 for converting analog signal into digital signal.

The projected image signal is outputted from the image pick-up element 51. The projected image signal undergoes sample-hold by the S/H circuit 52. The projected image signal is amplified to the value set beforehand by the amplifier 53 with the fixed gain to output to an output terminal of the amplifier 53. Output of the amplifier 53 is connected to three kinds of the attenuators 54, 55, and 56 connected in parallel. The output terminals of respective attenuators 54, 55, and 56 are connected to the selector 58. The selector 58 outputs the projected image signal to the output terminal of the attenuators 54, 55, and 56 while switching output of the attenuator, in answer to respective color separation signals of the color image sensor which outputs a plurality of color separation signal in serial. Attenuation ratio of the attenuators 54, 55, and 56 is adjusted beforehand in such a way that output ratio of respective color separation signal becomes equalized, thus the A/D converter 59 is capable of performing digitalization of the projected image signal with which is well white-balanced.

However, according to the above described conventional image signal processing device, there are following problems:

(1) According to the first conventional example, in order to adjust the gain of the signal, it is necessary to prepare both circuits of the GCA circuit and the white balance circuit. The size of the device inevitably becomes large. For that reason, dissipation power increases, thus cost thereof increases.

(2) According to the first conventional example, since it causes both of the GCA circuit and the white balance circuit to be controlled, it becomes necessary to prepare control signal and data line for the sake of the GCA control and the white balance control. Thus there is the problem that cost increases.

In general, 0 to 30 dB of the gain is required for the sake of the GCA control. On the other hand, −2 to 14 dB of the gain is required for the sake of the white balance control. It is necessary to control very wide dynamic range for the sake of the GCA control. For that reason, the GCA control is often controlled using log scale. On the other hand, with respect to the white balance control, control range is narrow. However, since it is necessary to execute accurate color correction, the white balance control is often controlled using linear scale. On the supposition that it causes the respective GCA circuit and white balance circuit to be controlled with 10-bit-precision, it becomes necessary to prepare the total 20 control lines for the sake of only data line. In recent years, the image pick-up device using the image signal processing device constituted by semiconductor integrated circuit is miniaturized. Area occupied by the control lines can not be disregarded. Increase of the control signal lines increases cost.

(3) According to the second conventional example, the selector switches output of the attenuator in accordance with respective color separation signals outputted from the color image sensor. On this occasion, switching signal of the selector influences drive system of the color image sensor, thus it is feared that it causes the noise to occur.

(4) Further, according to the second conventional example, the output signals from the different attenuators in answer to respective color separation signals are selected, thus there is the problem that it is difficult to correct dispersion of the element used in the attenuator. This problem can be resolved by providing a correction circuit. However, when a correction circuit is provided, there occurs the new problem that the circuit is complicated, and size of the circuit becomes large.

SUMMARY OF THE INVENTION

In view of the foregoing, it is an object of the present invention, in order to overcome the above mentioned problems, to provide an image signal processing device and an image signal processing method whose circuit scale is small, whose number of the control line is small.

It is another object of the present invention, to provide an image signal processing device and an image signal processing method in which influence of dispersion of the element is small, and there is provided a white balance circuit with high precision.

According to a first aspect of the present invention, in order to achieve the above-mentioned objects, there is provided an image signal processing device using a color image sensor outputting a plurality of color signals which comprises a gain control means for adjusting a signal into a prescribed signal level in each of a plurality of color signals outputted from the color image sensor, an analog/digital conversion means for converting an image signal obtained from an output of the gain control means into a digital signal successively, and a control means for controlling a gain of the gain control means, wherein the control means inputs therein at least more than one control signal of a synchronizing signal which is switched in every respective pixels while synchronizing with an arrangement of a color filter of a color image sensor, a synchronizing signal which is switched in every respective lines, a synchronizing signal which is switched in every respective frames, a synchronizing signal which is switched in every respective fields, and a gain set value in every respective arrangement of the color filter.

According to a second aspect of the present invention, in the first aspect, there is provided an image signal processing device, wherein the control means is provided with a storage means for storing therein a value of a gain which is referred by the gain control means in accordance with a color signal outputted from the color image sensor, and it causes the value stored in the storage means to be rewritten in every respective color signals by at least more than one of the control signals.

According to a third aspect of the present invention, in the first aspect, there is provided an image signal processing device, wherein the gain control means undergoes a gain control according to a gain set value in every the color filter arrangement.

According to a fourth aspect of the present invention, in the first or the third aspect, there is provided an image signal processing device, wherein the gain set value of respective color filter arrangement is a value of a gain which is obtained in such a way that gain value of a first gain control for controlling brightness of an image is multiplied by gain value of a second gain control for the sake of white balance of every respective color signals controlled in accordance with color signal inputted from the color image sensor beforehand.

According to a fifth aspect of the present invention, in any of the first, the third, the fourth aspects, there is provided an image signal processing device, wherein the gain set value of every color filter arrangement is obtained in such a way that it causes gain value of the first gain control to be represented with a floating-point representation, before the gain value of the first gain control represented with the floating-point representation is multiplied by the gain value of the second gain control.

According to a sixth aspect of the present invention, in the first aspect, there is provided an image signal processing device, wherein the gain control means has either one or more than two operational amplifier connected in series.

According to a seventh aspect of the present invention, in the first aspect, there is provided an image signal processing device, wherein the color image sensor is either one dimensional color image sensor or two-dimensional color image sensor.

According to an eighth aspect of the present invention, there is provided an image signal processing method using a color image sensor outputting a plurality of color signals, which comprises the steps of: a gain control step for adjusting a signal into a prescribed signal level in each of a plurality of color signals outputted from the color image sensor, an analog/digital conversion step for converting an image signal obtained from an output of the gain control means into a digital signal successively, and a control step for controlling a gain of the gain control means, wherein the control step inputs therein at least more than one control signal of a synchronizing signal which is switched in every respective pixels while synchronizing with an arrangement of a color filter of a color image sensor, a synchronizing signal which is switched in every respective lines, a synchronizing signal which is switched in every respective frames, a synchronizing signal which is switched in every respective fields, and a gain set value in every respective arrangement of the color filter.

According to a ninth aspect of the present invention, in the eighth aspect, there is provided an image signal processing method, wherein the control step is provided with a storage step for storing therein a value of a gain which is referred by the gain control step in accordance with a color signal outputted from the color image sensor, and it causes the value stored in the storage step to be rewritten in every respective color signals by at least more than one of the control signals.

According to a tenth aspect of the present invention, in the eighth aspect, there is provided an image signal processing method, wherein the gain control step undergoes a gain control according to a gain set value in every the color filter arrangement.

According to an eleventh aspect of the present invention, in the eighth or the tenth aspect, there is provided an image signal processing method, wherein the gain set value of respective color filter arrangement is a value of a gain which is obtained in such a way that gain value of a first gain control for controlling brightness of an image is multiplied by gain value of a second gain control for the sake of white balance of every respective color signals controlled in accordance with color signal inputted from the color image sensor beforehand.

According to a twelfth aspect of the present invention, in any of the eighth, the tenth, and the eleventh aspects, there is provided an image signal processing method, wherein the gain set value of every color filter arrangement is obtained in such a way that it causes gain value of the first gain control to be represented with a floating-point representation, before the gain value of the first gain control represented with the floating-point representation is multiplied by the gain value of the second gain control.

According to a thirteenth aspect of the present invention, there is provided a storage medium storing therein a program for executing an image signal processing method which comprises the steps of; a gain control step for adjusting a signal into a prescribed in each of a plurality of color signals outputted from the color image sensor, an analog/digital conversion step for converting an image signal obtained from an output of the gain control step into a digital signal successively, and a control step for controlling a gain of the gain control step, wherein the control step inputs therein at least more than one control signal of a synchronizing signal which is switched in every respective pixels while synchronizing with an arrangement of a color filter of a color image sensor, a synchronizing signal which is switched in every respective lines, a synchronizing signal which is switched in every respective frames, a synchronizing signal which is switched in every respective fields, and a gain set value in every respective arrangement of the color filter.

According to a fourteenth aspect of the present invention, in the thirteenth aspect, there is provided a storage medium storing therein a program for executing an image signal processing method, wherein the control step is provided with a storage step for storing therein a value of a gain which is referred by the gain control step in accordance with a color signal outputted from the color image sensor, and it causes the value stored in the storage step to be rewritten in every respective color signals by at least more than one of the control signals.

According to a fifteenth aspect of the present invention, in the thirteenth aspect, there is provided a storage medium storing therein a program for executing an image signal processing method, wherein the gain control step undergoes a gain control according to a gain set value in every the color filter arrangement.

According to a sixteenth aspect of the present invention, in the thirteenth aspect or the fifteenth aspect, there is provided a storage medium storing therein a program for executing an image signal processing method, wherein the gain set value of respective color filter arrangement is a value of a gain which is obtained in such a way that gain value of a first gain control for controlling brightness of an image is multiplied by gain value of a second gain control for the sake of white balance of every respective color signals controlled in accordance with color signal inputted from the color image sensor beforehand.

According to a seventeenth aspect of the present invention, in any of the thirteenth, fifteenth, and sixteenth aspects, there is provided a storage medium storing therein a program for executing an image signal processing method, wherein the gain set value of every color filter arrangement is obtained in such a way that it causes gain value of the first gain control to be represented with a floating-point representation, before the gain value of the first gain control represented with the floating-point representation is multiplied by the gain value of the second gain control.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENT

A preferred embodiment of the present invention will be described in detail in accordance with the accompanying drawings.

Figure 1:
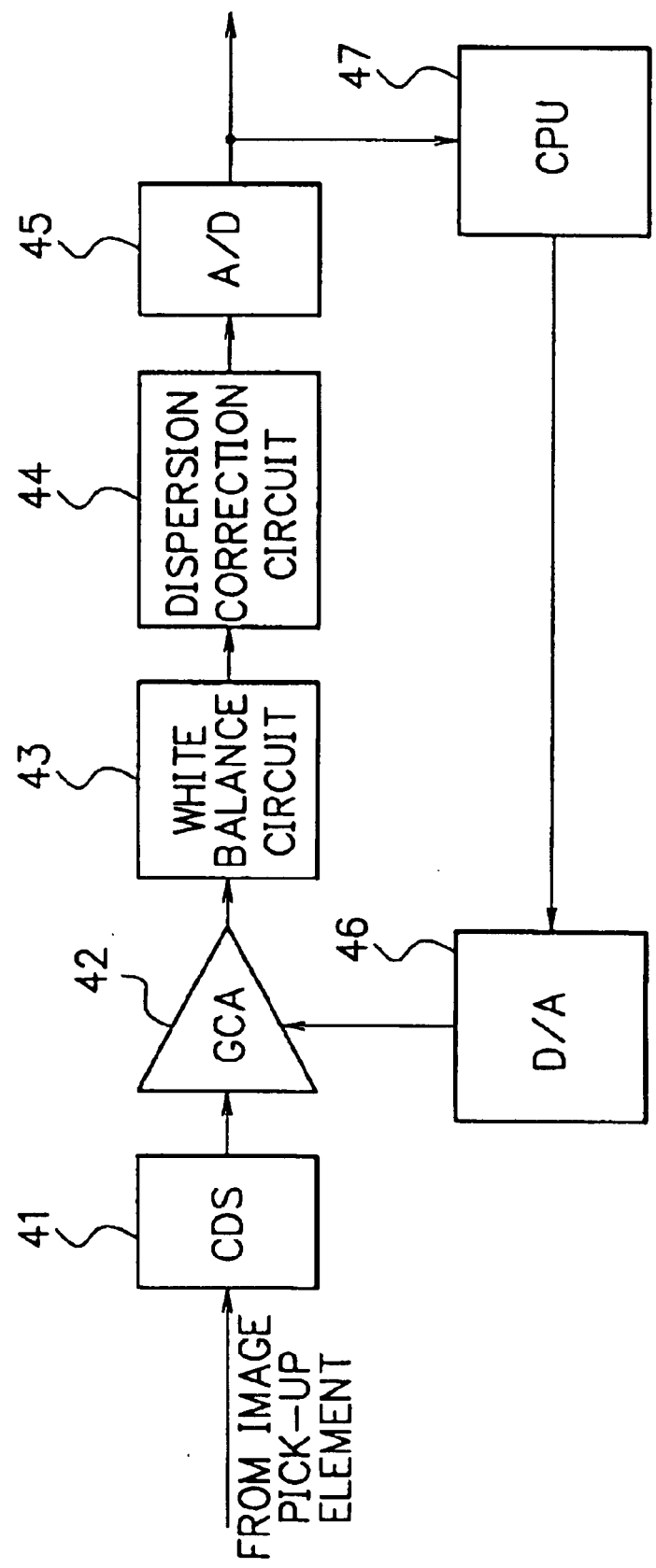
FIG. 1 is a block diagram showing a conventional image signal processing device (a first conventional example)
Figure 2:
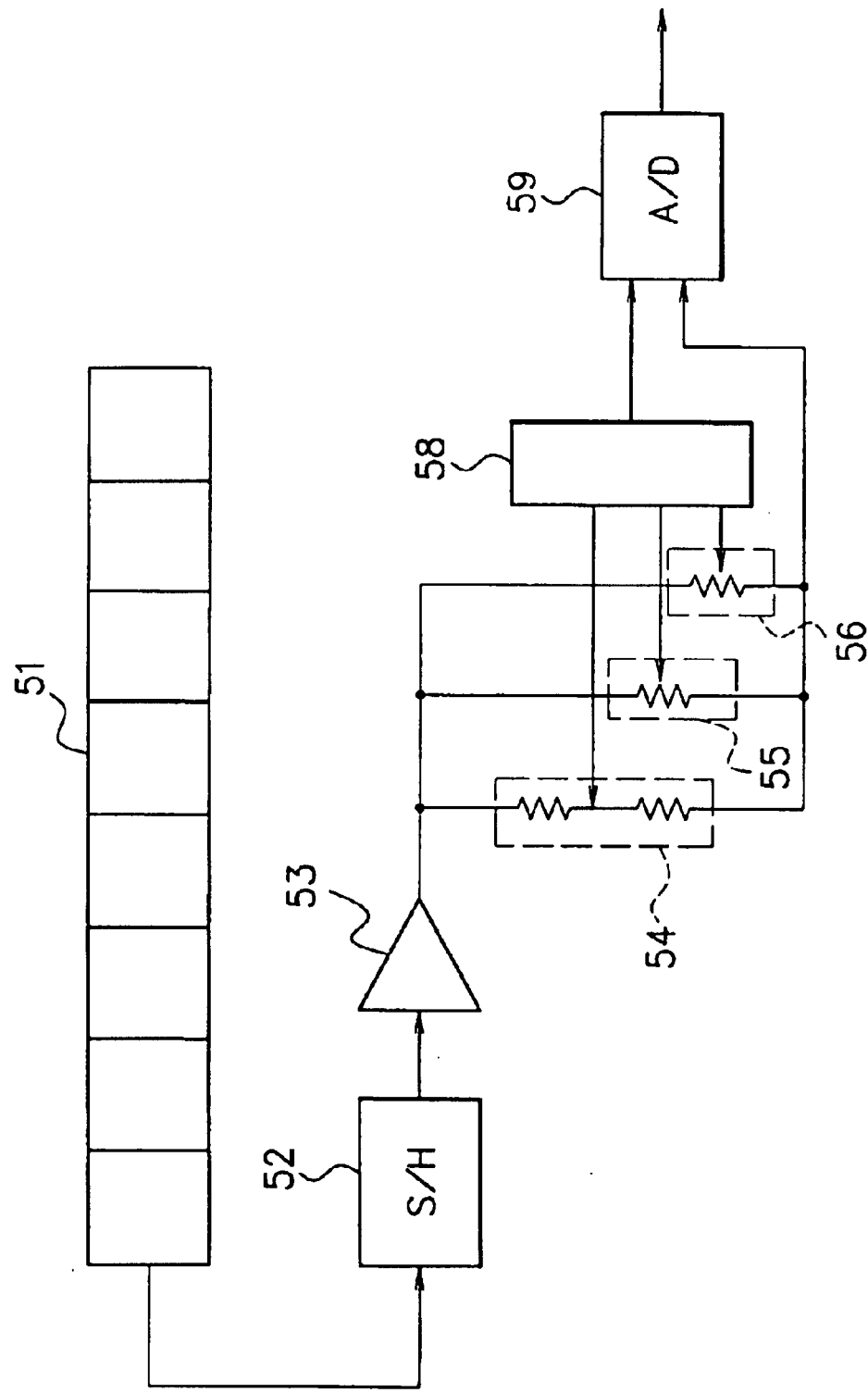
FIG. 2 is a block diagram showing a conventional image signal processing device (a second conventional example)
Figure 3:
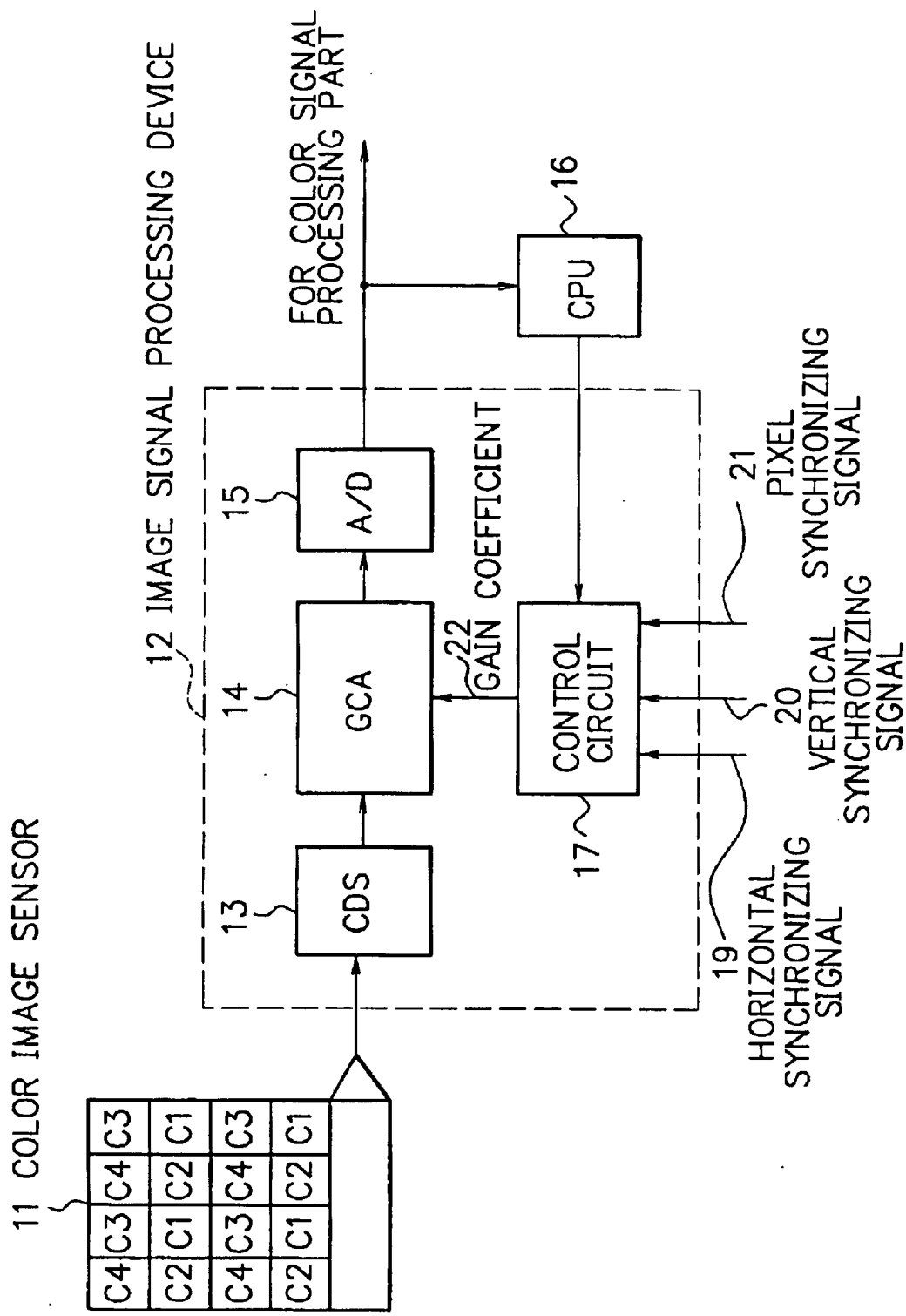
FIG. 3 is a block diagram showing a configuration of an image signal processing device according to present embodiment.

FIG. 3 is a block diagram showing a configuration of the image signal processing device to which an embodiment of the present invention is applied.

As shown in FIG. 3, the image signal processing device uses a color image sensor 11 as an input signal source. The color image sensor 11 functions as a CCD camera, or digital still camera and so forth. In such a color image sensor 11, order of a color filter in every pixel is equal in every respective horizontal line. The image signal processing device comprises a correlated double sampling circuit (hereinafter referred to as CDS circuit) 13 for removing noise included in projected image signal outputted from the color image sensor 11, a gain control circuit (hereinafter referred to as CCA: Gain Control Amplifier circuit) 14 for adjusting a signal level in every color separation signal into a prescribed signal level, an analog/digital conversion circuit (hereinafter referred to as ADC circuit) 15 for quantizing the image signal successively, and a control circuit 17 for controlling gain of the GCA circuit 14.

Figure 4:
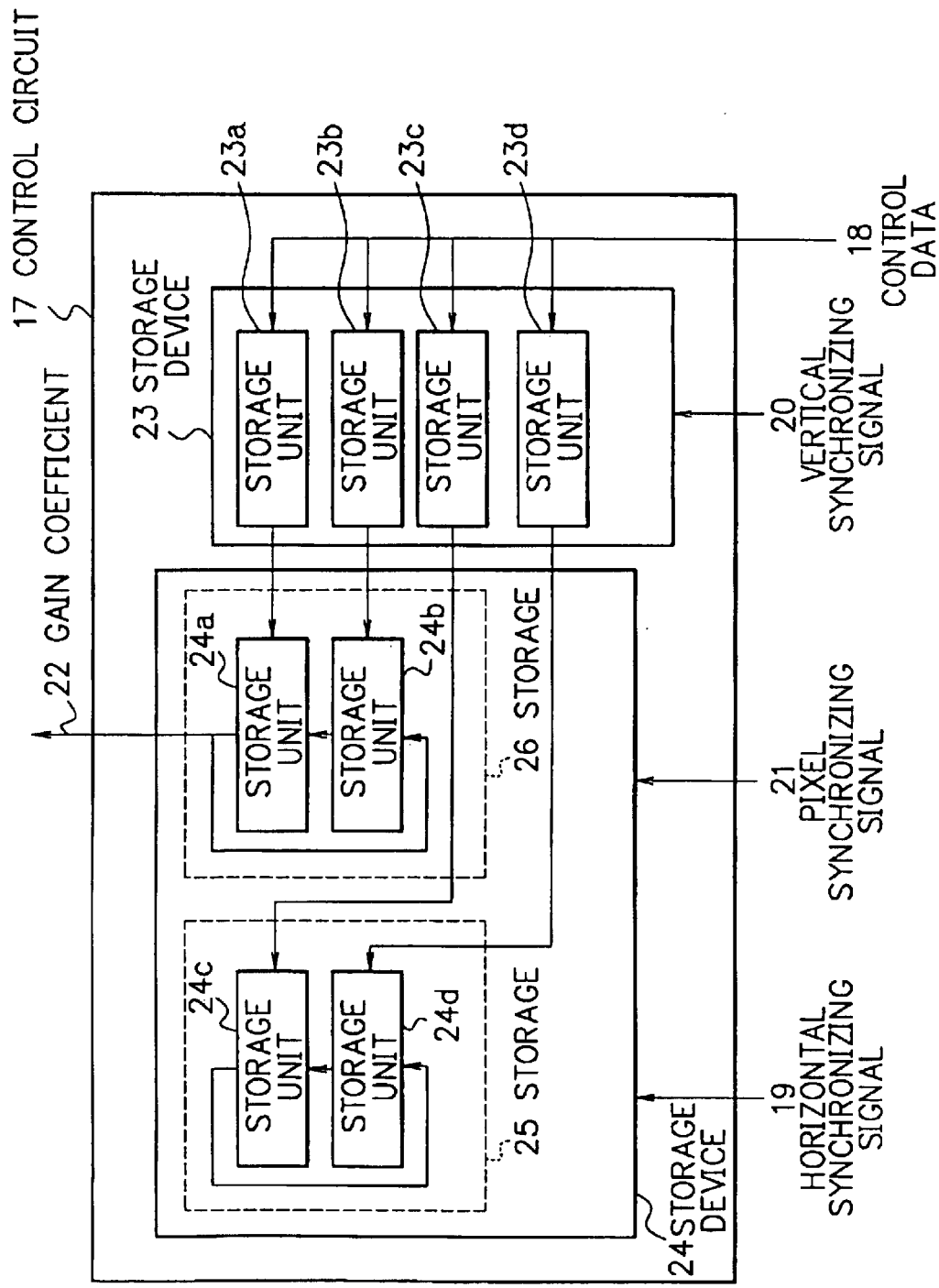
FIG. 4 is a block diagram showing detail of a control circuit of FIG. 3.

FIG. 4 is a block diagram showing a configuration of the control circuit 17 shown in FIG. 3.

As shown in FIG. 4, the control circuit 17 comprises a storage device 24 for storing therein gain in every pixel used in an image frame F1 at a certain time, and a storage device 23 for storing therein gain in every pixel used in a frame F2 which is next time of the frame F1.

In this configuration, the storage device 24 consists of a storage 25 and a storage 26. Content of these two storages can be displaced by a horizontal synchronizing signal 19. The respective storages 25, and 26 are constituted by more than two storage units. Content of these more than two storage units can be displaced by a pixel synchronizing signal 21.

Further, the storage device 23 consists of four storage units 23a, 23b, 23c, and 23d. Content of respective storage units can be updated by a vertical synchronizing signal 20.

Furthermore, the control signal inputted to the control circuit 17 is not restricted by the above described one. It is also suitable of a signal representing field.

Figure 5:
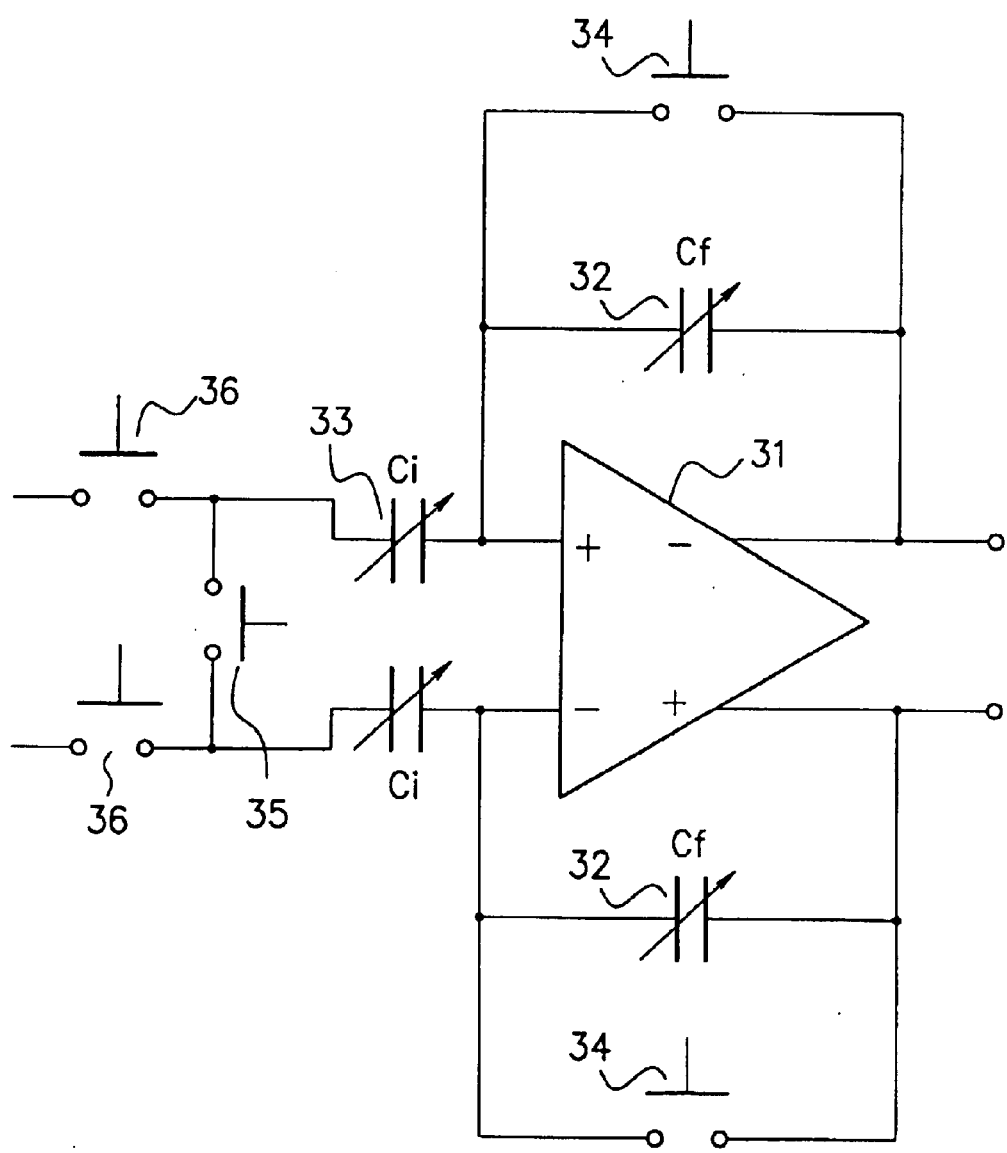
FIG. 5 is a block diagram showing detail of a gain control circuit of FIG. 3.

FIG. 5 is a view showing a circuit configuration of the GCA circuit 14 shown in FIG. 3.

As shown in FIG. 3, the GCA circuit 14 comprises an operational amplifier 31, a variable-capacitance 32 and a switch 34 connected between an input and an output of the operational amplifier 31, a variable capacitance 33 connected to an input of the operational amplifier 31, a switch 35 for shorting input of the variable-capacitance 33, and a switch 36 for turning inputted signal ON or OFF. Further, it is suitable that the more than two operational amplifiers 31 are connected in series.

Here, these variable-capacitance 32, 33 and switches 34, 36 are connected symmetrically with respect to the operational amplifier 31.

Figure 6:
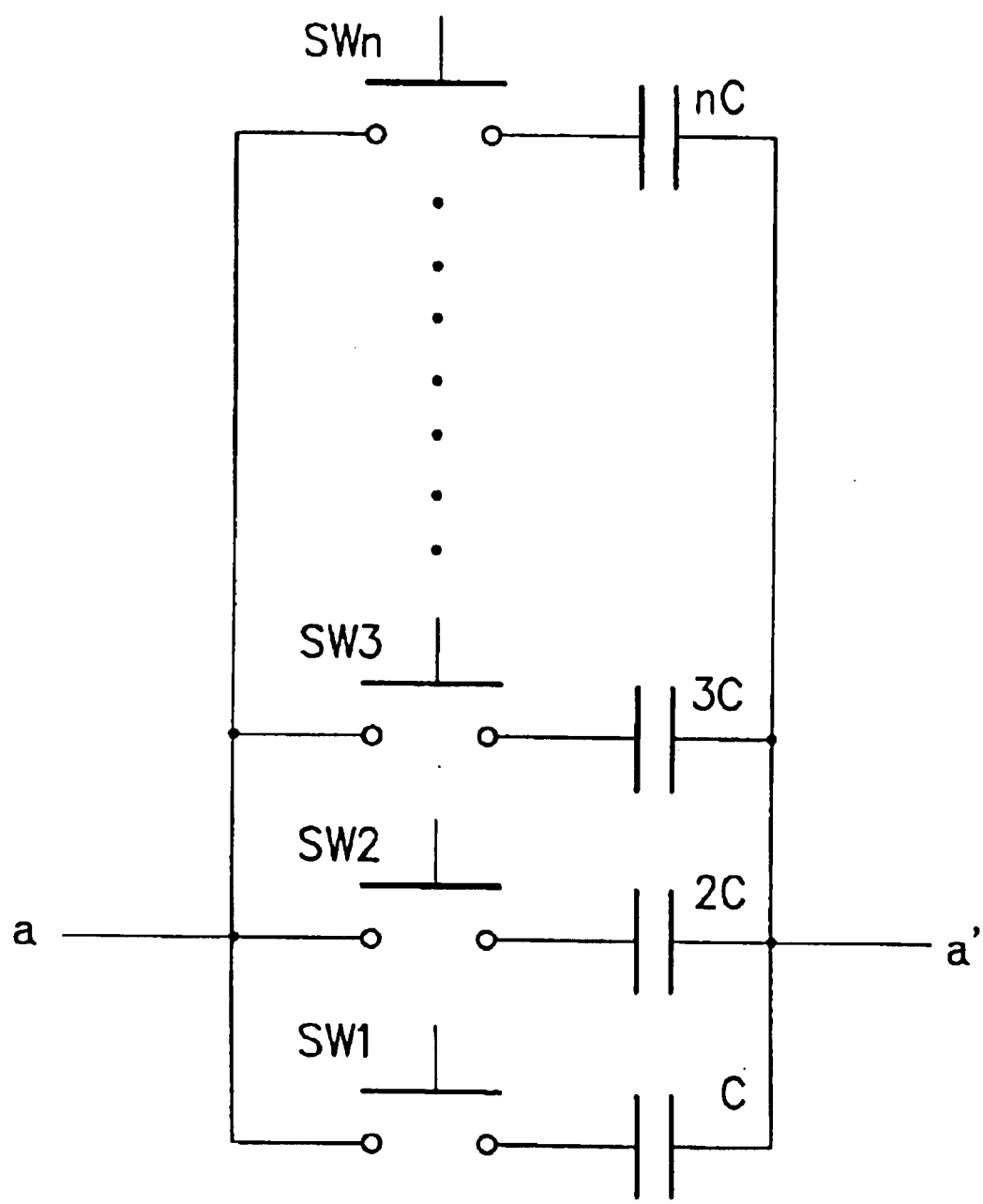
FIG. 6 is a view showing constitution of variable-capacitance of FIG. 5.

FIG. 6 is a view showing a configuration of the variable-capacitance 32, 33 of FIG. 5.

As shown in FIG. 6, the variable-capacitance 32, 33 are constituted from weighted capacitance such that size is C, 2C, 3C, . . . nC. The capacitance between a–a' is capable of being formed as capacitance value of the kinds of the n-th power of 2 due to selection of switches SW1 to SWn.

Next, operation of the present embodiment will be described referring to FIG. 3.

The color image sensor 11 outputs the projected image signal. The projected image signal are outputted from the color image sensor 11 in serial while corresponding to the color filters C1, C2, C3, and C4 provided on the pixels of the color image sensor 11. The projected image signal outputted from the color image sensor 11 is a color signal corresponding to the color filter arranged as C1, C2, C1, C2, in order from the first horizontal line. The color signal corresponding to the color filter arranged in order of C1, C2, C1, C2 is outputted from the first horizontal line. The color signal corresponding to the color filter arranged in order of C3, C4, C3, C4 is outputted from the second horizontal line. Then for the subsequent horizontal lines, output of color signal in the manner of the first horizontal line and second horizontal line is repeated.

The projected image signal is supplied to the CDS circuit 13. In the CDS circuit 13, noise is removed from the projected image signal. The projected image signal from which the noise is removed is outputted to the output terminal of the CDS circuit 13. The GCA circuit 14 inputs therein such the output signal. The GCA circuit 14 refers to gain coefficient 22 inputted from the control circuit 17 in each of the respective pixels in order to amplify the signal so as to become prescribed gain determined by the gain coefficient 22.

The projected image signal outputted from the GCA circuit 14 is converted from analog signal into digital signal by the ADC circuit 15, before sending to color signal processing part such as a digital signal processor not illustrated. Further, the projected image signal undergoing digitalization is inputted to the CPU 16. The CPU 16 executes operation for the sake of gain control rendering optimum for brightness of the whole picture, before bring bringing out the gain G. Further, the CPU 16 executes operation for the sake of control of the white balance. The CPU 16 brings out the gains GC1, GC2, GC3, and GC4 in every respective pixel C1, C2, C3, and C4 in order to implement control of the white balance. With respect to method for bringing out the respective gains, the expert in the art knows well, further, it is not related to the invention directly, thus detailed description is omitted. The prescribed operation is executed in the CPU 16 with respect to the gain G, and the gains GC1 to GC4. The GCA circuit 14 inputs therein the gain of the image signal corresponding to respective color filters of the color image sensor 11. The CPU 16 outputs such the gain of the image signal to the control circuit 17 as control data 18.

The control circuit 17 changes the gain coefficient 22 while being synchronized with the vertical synchronizing signal 20 (which may also reflect respective fields of an interlaced scan, as is known in the art), the horizontal synchronizing signal 19, and the pixel synchronizing signal 21. Thus, the color separation signal corresponding to respective pixels outputted from the color image sensor is subjected to digitalization as the signal with optimum signal level and with suitable white balance.

Thus, since it enables the gain to be altered while synchronizing with the color filter on the color image sensor, it becomes possible to perform gain control causing the image projected on the monitor to be prescribed brightness and white balance control by only one circuit block. For that reason, it enables the circuit scale to be small. Further, it becomes possible to execute the white balance control by only one circuit block, accordingly, it is capable of reducing influence of dispersion of circuit elements for implementing the white balance control, thus an excessive circuit for correcting dispersion can be eliminated.

Further, when it causes content of the gain to be rewritten, the selector is not used for the sake of switching of the gain which the GCA circuit refers to. Consequently, on the occasion of gain switching, it is capable of reducing mixture of noise caused by switching signal.

Next, operation of the control circuit 17 will be described referring to FIG. 4.

There are provided the storage units 23a to 23d corresponding to the number of the color filters of the color image sensor 11 in the storage device 23. The respective storage units 23a to 23d store therein necessary gain (control data 18) for the sake of the projected image signal obtained from respective color filters sent from the CPU 16.

The storage device 23 is informed by the vertical synchronizing signal 20 that the frame of the color image sensor 11 is switched. On this occasion, the storage device 23 displaces content of respective storage units 23a to 23d to the storage units 24a to 24d which constitute the storage device 24. The storage device 23 receives the control data 18 which is used in the next frame from the CPU 16 to be stored.

The storage 26 constituting the storage device 24 stores therein the gain of the projected image signal obtained from the color filter constituting the first horizontal line of the color image sensor 11. The storage 25 stores therein the gain of the projected image signal obtained from the color filter constituting the second horizontal line of the color image sensor 11.

When the storage device 24 informed that the projected image outputted from the color image sensor by the horizontal synchronizing signal 19 is switched from the first horizontal line to the second horizontal line, the storage device 24 reverses content of the storage 25 to the content of the storage 26, as depicted by double arrow 29.

With respect to the content of storage units 24c, 24d which constitute the storage 25, respective contents thereof are reversed by the pixel synchronizing signal 21. Similarly, the content of the storage units 24a, 24b which constitute the storage 26, respective contents thereof are reversed by the pixel synchronizing signal 21. The content of the storage device 24a is outputted from the control circuit 17 as the gain coefficient 22.

Next, there will be described operation of the GCA circuit 14 referring to FIG. 5.

The GCA circuit 14 is a gain control amplifier using a switched capacitor circuit which is capable of obtaining the gain of Ci/Cf such that it causes the switch 35 and the switches 36, 34 to be changed mutually. It is capable of being obtained the gain represented by capacitance ratio while changing any of Ci and Cf.

Referring to FIG. 6, it is capable of selecting weighted capacitance by closing the switch inserted in series to the capacitance. For that reason, capacitance between "a–a'" is capable of being prepared the n-th power of 2, therefore, it becomes possible to set the gain of the GCA while using the switches. Further, here, there is described about the GCA circuit constituted from one-stage construction of the operational amplifier, however, it is suitable that it causes the operational amplifier more than two-stage construction to be connected in series.

Next, there will be described method for bringing-out of the control data 18 inputted to the control circuit 17 and the gain coefficient 22 inputted to the GCA circuit 14.

The CPU 16 operates the gain G, and the gains for the white balance GC1 to GC4. These gain G and gains for the white balance GC1 to GC4 which are, for instance, computed with precision of 10-bit are obtained as data of total 20 bits. These data are multiplied within the CPU to be rounded in every 10 bits, before being sent to the control circuit 17 as the control data. Further, when the gain G is given with log scale, and the gains for the white balance GC1 to GC4 are given with linear scale respectively, it causes gain coefficient for an iris to be represented by floating-point representation before multiplication to separate into exponent part and fixed-point part, thus executing multiplication between respective exponent part and fixed-point part, and the gain for iris.

Thus, the gain G and the gains for the sake of the white balance GC1 to GC4 are used for the sake of gain control causing the image projected on the monitor to be prescribed brightness. Such gain G and the gains for the sake of the white balance GC1 to GC4 are operated within the CPU. On this occasion, the gain G is represented with the floating-point representation, before executing multiplication. Consequently, the gain G given with the log scale is multiplied by the gains for the white balance GC1 to GC4, thus the result of the multiplication is represented with the floating-point representation. The result of such multiplication is capable of being inputted to the gain control circuit with the floating-point presentation. The gain control circuit can be implemented without adding excessive circuit for converting the log scale into the linear scale when an inputted data is presented with the floating-point representation because the relationship between the data and the gain is linear relationship. As a result, it is capable of simplifying the gain control circuit.

Further, both of the gain control and the white balance control causing the image projected on the monitor to be prescribed brightness are executed simultaneously, and it causes the result of multiplication with the CPU to be used regarding necessary value for the sake of respective control beforehand. For that reason, it is not necessary to input necessary data individually for the sake of each control. Thus, it is capable of reducing area for wiring of data line necessary for the iris control required for the printed substrate and so forth, and for the white balance control.

As another embodiment of the present invention, the another embodiment has the same fundamental constitution that of the above described embodiment. The color filter arrangement on the color image sensor is different from above described embodiment. On this occasion, it is capable of changing number and/or configuration of the storage unit within the control circuit 17 in accordance with the arrangement of the color filter.

Further, in the above-described respective embodiments, the two-dimensional color image sensor such as the CCD camera, or the digital still camera or so forth is listed as example, however, it is not restricted by these equipment. For instance, it is suitable of primary-dimensional color image sensor such as the color image scanner or so forth.

As described above, according to the image signal processing device and the image signal processing method of the present invention, there are provided at least the gain control means (the gain control process) for adjusting a signal level into a prescribed signal level in each of the plural color signals outputted from the color image sensor, the analog/digital conversion means (the analog/digital conversion process) for converting the image signal obtained from the output of the gain control means (the gain control process) into the digital signal successively, and the control means (the control process) for controlling the gain of the gain control means (the gain control process). The control means (the control process) inputs therein at least more than one control signals of the synchronizing signal which is switched in every respective pixels while synchronizing with the arrangement of the color filter of the color image sensor, the synchronizing signal which is switched in every respective line, the synchronizing signal which is switched in every respective frame, the synchronizing signal which is switched in every respective field, and the gain set value in every respective arrangement of the color filter. Accordingly, it is capable of reducing the circuit scale, and it is capable of reducing influence of dispersion of the elements, thus it is capable of obtaining the white balance with high precision.

While preferred embodiments of the invention have been described using specific terms, the description has been for illustrative purpose only, and it is to be understood that changes and variations may be made without departing from the spirit or scope of the following claims.

What is claimed is:

1. An image signal processing device using a color image sensor outputting a plurality of color signals, said image signal processing device comprising:

a gain control means for adjusting a signal level into a prescribed signal level in every color signal of every pixel of said plurality of color signals outputted from said color image sensor;

an analog/digital conversion means for converting an image signal obtained from an output of said gain control means into a sequence of digital signals; and a control means for controlling a gain of said gain control means for each color signal of each pixel of each line of each frame of an image, wherein said control means receives inputs therein corresponding to more than one control signal for each synchronizing signal which is switched in every respective pixel such that said control means provides gain control signals to said gain control means synchronized with an arrangement of a color filter of a color image sensor, a synchronizing signal which is switched in accordance with every respective line, a synchronizing signal which is switched in accordance with every respective frame, and a gain set value in every respective arrangement of the color filter.

2. An image signal processing device as claimed in claim 1, wherein said control means is provided with a storage means for storing therein a value of a gain which is referred by said gain control means in accordance with a color signal outputted from said color image sensor, which causes said value stored in the storage means to be rewritten in every respective color signal by at least more than one of said control signals.

3. An image signal processing device as claimed in claim 1, wherein said gain control means undergoes a gain control according to a gain set value in every said color filter arrangement.

4. An image signal processing device as claimed in claim 1, wherein said gain set value of a respective color filter arrangement is a value of a gain which is obtained in such a way that gain value of a first gain control for controlling brightness of an image is multiplied by gain value of a second gain control for white balance of every respective color signal controlled in accordance with color signal inputted from said color image sensor.

5. An image signal processing device as claimed in claim 3, wherein said gain set value of a respective color filter arrangement is a value of a gain which is obtained in such a way that gain value of a first gain control for controlling brightness of an image is multiplied by gain value of a second gain control for white balance of every respective color signal controlled in accordance with color signal inputted from said color image sensor.

6. An image signal processing device as claimed in claim 1, wherein said gain set value of every color filter arrangement is obtained in such a way that it causes gain value of a first gain control to be represented with a floating-point representation, before the gain value of said first gain control represented with said floating-point representation is multiplied by a gain value of a second gain control.

7. An image signal processing device as claimed in claim 3, wherein said gain set value of every color filter arrangement is obtained in such a way that it causes gain value of a first gain control to be represented with a floating-point representation, before the gain value of said first gain control represented with said floating-point representation is multiplied by a gain value of a second gain control.

8. An image signal processing device as claimed in claim 4, wherein said gain set value of every color filter arrangement is obtained in such a way that it causes gain value of said first gain control to be represented with a floating-point representation, before the gain value of said first gain control represented with said floating-point representation is multiplied by the gain value of said second gain control.

9. An image signal processing device as claimed in claim 5, wherein said gain set value of every color filter arrangement is obtained in such a way that it causes gain value of said first gain control to be represented with a floating-point representation, before the gain value of said first gain control represented with said floating-point representation is multiplied by the gain value of said second gain control.

10. An image signal processing device as claimed in claim 1, wherein said gain control means has either one or more than two operational amplifying means connected in series.

11. An image signal processing device as claimed in claim 1, wherein said color image sensor is either a one dimensional color image sensor or a two-dimensional color image sensor.

12. An image signal processing method using a color image sensor outputting a plurality of color signals, said image signal processing method comprising the steps of:
a gain control step for adjusting a signal level into a prescribed signal level in every color signal of every pixel of said plurality of color signals outputted from said color image sensor;
an analog/digital conversion step for converting an image signal obtained from an output of said gain control step into a sequence of digital signals; and
a control step for controlling a gain of said gain control step for each color signal of each pixel of each line of each frame of an image,
wherein said control step receives inputs therein corresponding to more than one control signal for each synchronizing signal which is switched in every respective pixel such that said control step provides gain control signals for said gain control step synchronized with an arrangement of a color filter of a color image sensor, a synchronizing signal which is switched in accordance with every respective line, a synchronizing signal which is switched in accordance with every respective frame, and a gain set value in every respective arrangement of the color filter.

13. An image signal processing method as claimed in claim 12, wherein said control step is provided with a storage step for storing therein a value of a gain which is referred by said gain control step in accordance with a color signal outputted from said color image sensor, which causes said value stored in the storage step to be rewritten in every respective color signal by at least more than one of said control signals.

14. An image signal processing method as claimed in claim 12, wherein said gain control step undergoes a gain control according to a gain set value in every said color filter arrangement.

15. An image signal processing method as claimed in claim 12, wherein said gain set value of respective color filter arrangement is a value of a gain which is obtained in such a way that gain value of a first gain control for controlling brightness of an image is multiplied by gain value of a second gain control for white balance of every respective color signal controlled in accordance with color signal inputted from said color image sensor.

16. An image signal processing method as claimed in claim 14, wherein said gain set value of respective color filter arrangement is a value of a gain which is obtained in such a way that gain value of a first gain control for controlling brightness of an image is multiplied by gain value of a second gain control for white balance of every respective color signal controlled in accordance with color signal inputted from said color image sensor.

17. An image signal processing method as claimed in claim 12, wherein said gain set value of every color filter arrangement is obtained in such a way that it causes gain value of a first gain control to be represented with a floating-point representation, before the gain value of said first gain control represented with said floating-point representation is multiplied by gain value of a second gain control.

18. An image signal processing method as claimed in claim 14, wherein said gain set value of every color filter arrangement is obtained in such a way that it causes gain value of a first gain control to be represented with a floating-point representation, before the gain value of said first gain control represented with said floating-point representation is multiplied by a gain value of a second gain control.

19. An image signal processing method as claimed in claim 15, wherein said gain set value of every color filter arrangement is obtained in such a way that it causes gain value of said first gain control to be represented with a floating-point representation, before the gain value of said first gain control represented with said floating-point representation is multiplied by the gain value of said second gain control.

20. An image signal processing method as claimed in claim 16, wherein said gain set value of every color filter arrangement is obtained in such a way that it causes gain value of said first gain control to be represented with a floating-point representation, before the gain value of said first gain control represented with said floating-point representation is multiplied by the gain value of said second gain control.

21. A storage medium storing therein a program for executing an image signal processing method which comprises the steps of;
   a gain control step for adjusting a signal into a prescribed signal level in every color signal of every pixel of said plurality of color signals outputted from said color image sensor;
   an analog/digital conversion step for converting an image signal obtained from an output of said gain control step into a sequence of digital signals; and
   a control step for controlling a gain of said gain control step for each color signal of each pixel of each line of each frame of an image,
   wherein said control step receives inputs therein corresponding to more than one control signal for each synchronizing signal which is switched in every respective pixel such that said control step provides gain control signals for said gain control step synchronized with an arrangement of a color filter of a color image sensor, a synchronizing signal which is switched in accordance with every respective line, a synchronizing signal which is switched in accordance with every respective frame, and a gain set value in every respective arrangement of the color filter.

22. A storage medium storing therein a program for executing an image signal processing method as claimed in claim 21, wherein said control step is provided with a storage step for storing therein a value of a gain which is referred by said gain control step in accordance with a color signal outputted from said color image sensor, which causes said value stored in the storage step to be rewritten in every respective color signal by at least more than one of said control signals.

23. A storage medium storing therein a program for executing an image signal processing method as claimed in claim 21, wherein said gain control step undergoes a gain control according to a gain set value in every said color filter arrangement.

24. A storage medium storing therein a program for executing an image signal processing method as claimed in claim 21, wherein said gain set value of respective color filter arrangement is a value of a gain which is obtained in such a way that gain value of a first gain control for controlling brightness of an image is multiplied by gain value of a second gain control for white balance of every respective color signal controlled in accordance with color signal inputted from said color image sensor.

25. A storage medium storing therein a program for executing an image signal processing method as claimed in claim 23, wherein said gain set value of respective color filter arrangement is a value of a gain which is obtained in such a way that gain value of a first gain control for controlling brightness of an image is multiplied by gain value of a second gain control for white balance of every respective color signal controlled in accordance with color signal inputted from said color image sensor.

26. A storage medium storing therein a program for executing an image signal processing method as claimed in claim 21, wherein said gain set value of every color filter arrangement is obtained in such a way that it causes gain value of a first gain control to be represented with a floating-point representation, before the gain value of said first gain control represented with said floating-point representation is multiplied by a gain value of a second gain control.

27. A storage medium storing therein a program for executing an image signal processing method as claimed in claim 23, wherein said gain set value of every color filter arrangement is obtained in such a way that it causes gain value of a first gain control to be represented with a floating-point representation, before the gain value of said first gain control represented with said floating-point representation is multiplied by a gain value of a second gain control.

28. A storage medium storing therein a program for executing an image signal processing method as claimed in claim 24, wherein said gain set value of every color filter arrangement is obtained in such a way that it causes gain value of said first gain control to be represented with a floating-point representation, before the gain value of said first gain control represented with said floating-point representation is multiplied by the gain value of said second gain control.

29. A storage medium storing therein a program for executing an image signal processing method as claimed in claim 25, wherein said gain set value of every color filter arrangement is obtained in such a way that it causes gain value of said first gain control to be represented with a floating-point representation, before the gain value of said first gain control represented with said floating-point representation is multiplied by the gain value of said second gain control.

30. An image signal processing device as claimed in claim 1, wherein said control means further provides gain control signals to said gain control means synchronized with a synchronizing signal which is switched in every respective field.

31. An image signal processing method as claimed in claim 12, wherein said control means further provides gain control signals to said gain control means synchronized with a synchronizing signal which is switched in every respective field.

32. A storage medium storing therein a program for executing an image signal processing method as claimed in claim 21, wherein said control means further provides gain control signals to said gain control means synchronized with a synchronizing signal which is switched in every respective field.

* * * * *